(12) United States Patent
Nakamura et al.

(10) Patent No.: US 9,727,817 B2
(45) Date of Patent: Aug. 8, 2017

(54) INFORMATION PROCESSING USING A REDUCED AUTOREGRESSIVE MODEL AND A NETWORK STRUCTURE CONSTRUCTED BASED ON TIME DELAY

(75) Inventors: Tomomichi Nakamura, Kanagawa (JP); Kazuhiro Sakurada, Kanagawa (JP); Toshihiro Tanizawa, Kochi (JP)

(73) Assignee: Sony Corporation, Tokyo (JP)

( * ) Notice: Subject to any disclaimer, the term of this patent is extended or adjusted under 35 U.S.C. 154(b) by 772 days.

(21) Appl. No.: 14/125,644

(22) PCT Filed: Jun. 21, 2012

(86) PCT No.: PCT/JP2012/065816
§ 371 (c)(1),
(2), (4) Date: Dec. 12, 2013

(87) PCT Pub. No.: WO2013/002107
PCT Pub. Date: Jan. 3, 2013

(65) Prior Publication Data
US 2014/0114897 A1    Apr. 24, 2014

(30) Foreign Application Priority Data
Jun. 29, 2011   (JP) .................................. 2011-144894

(51) Int. Cl.
*G06N 5/02*     (2006.01)
*G06Q 10/04*   (2012.01)
*G06F 17/18*   (2006.01)

(52) U.S. Cl.
CPC .............. *G06N 5/02* (2013.01); *G06F 17/18* (2013.01); *G06Q 10/04* (2013.01)

(58) Field of Classification Search
None
See application file for complete search history.

(56) References Cited

U.S. PATENT DOCUMENTS

2006/0129395 A1   6/2006   Thiesson et al.

FOREIGN PATENT DOCUMENTS

| JP | 2005-216202 | 8/2005 |
| WO | 97/25676 | 7/1997 |

OTHER PUBLICATIONS

M. Small, J. Zhang, X. Xu, Transforming time series into complex networks, in: Complex Sciences, Springer, Berlin, Heidelberg, Shanghai, China, 2009, pp. 2078-2089.*

(Continued)

*Primary Examiner* — Stanley K Hill
*Assistant Examiner* — Robert Bejcek, II
(74) *Attorney, Agent, or Firm* — K&L Gates LLP (57) ABSTRACT

The present technique relates to an information processing device, an information processing method, a recording medium, and a program capable of extracting the structure of time series data. An acquisition unit acquires time series data, a conversion unit converts the obtained time series data into an RAR model, and a prediction unit predicts the future of an event that is currently in progress using the RAR model. The present technique can be applied when predicting the future of a phenomenon that changes with time such as weather, earthquake, natural environment, human health, and economy from time series data.

9 Claims, 7 Drawing Sheets (56) References Cited

OTHER PUBLICATIONS

Zhang et al. Characterizing pseudoperiodic time series through the complex network approach. Physica D 237 (2008) 2856-2865.*
Edelsbrunner et al. Persistent Homology—a Survey. Eds. Jacob E. Goodman, Janos Pach and Richard Pollack. Contemporary Mathematics. 2008: vol. 453. pp. 257-282.*
Michael Small, "Optimal time delay embedding for nonlinear time series modeling," Dec. 5, 2003, p. 1-5, especially p. 1. <URL: http://arxiv.org/abs/nlin/0312011> (5 pages).
Kevin Judd et al., "Embedding as a modeling problem," Physica D, No. 120, 1998, pp. 273-286. (14 pages).

* cited by examiner

|  | x(t) | x(t-1) | x(t-2) | x(t-3) | x(t-4) | x(t-5) | x(t-6) |
|---|---|---|---|---|---|---|---|
| x(t) | 0 | 1 | 0 | 1 | 0 | 0 | 0 |
| x(t-1) | 1 | 0 | 1 | 0 | 1 | 0 | 0 |
| x(t-2) | 0 | 1 | 0 | 0 | 0 | 1 | 0 |
| x(t-3) | 1 | 0 | 0 | 0 | 0 | 0 | 1 |
| x(t-4) | 0 | 1 | 0 | 0 | 0 | 0 | 0 |
| x(t-5) | 0 | 0 | 1 | 0 | 0 | 0 | 0 |
| x(t-6) | 0 | 0 | 0 | 1 | 0 | 0 | 0 |

FIG. 6

$$\begin{pmatrix} 0 & 1 & 0 & 1 & 0 & 0 & 0 \\ 1 & 0 & 1 & 0 & 1 & 0 & 0 \\ 0 & 1 & 0 & 0 & 0 & 1 & 0 \\ 1 & 0 & 0 & 0 & 0 & 0 & 1 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \end{pmatrix}$$

INFORMATION PROCESSING USING A REDUCED AUTOREGRESSIVE MODEL AND A NETWORK STRUCTURE CONSTRUCTED BASED ON TIME DELAY

CROSS REFERENCES TO RELATED APPLICATIONS

The present application is a national stage of International Application No. PCT/JP2012/065816 filed on Jun. 21, 2012 and claims priority to Japanese Patent Application No. 2011-144894 filed on Jun. 29, 2011, the disclosure of which is incorporated herein by reference.

BACKGROUND

The present technique relates to an information processing device, an information processing method, a recording medium, and a program, and particularly to an information processing device, an information processing method, a recording medium, and a program capable of extracting the structure of time series data.

BACKGROUND ART

Prediction of a time developing phenomenon (namely, a phenomenon that changes with time) such as weather, earthquake, natural environment, human health, and economy is an important matter in order to cope with a disaster, disease, crisis and the like in advance. Immediately after a phenomenon occurs, prediction with high accuracy for the phenomenon can be expected. In this case, the currently occurring phenomenon is observed, the event thereof is investigated, and the knowledge therefrom is utilized, thereby making it possible to predict, in a short term, a phenomenon that will occur immediately after the currently occurring phenomenon. Since the prediction is performed for a phenomenon that will occur immediately after the observed phenomenon occurs, a system used in the prediction is assumed to be the same as a system of the observed phenomenon.

On the other hand, it is extremely difficult to predict what will happen after a long period of time, such as several days, several months, several years, and several decades have passed from the currently occurring phenomenon. There is no point in merely extending a prediction period of the currently occurring phenomenon. If a system used in the prediction is the same as the system of the observed phenomenon, it is not possible to obtain a predictive value with high accuracy due to a problem in the accuracy of an initial value and the presence of system noise. In addition, it is quite possible that a system may change during a long period of time so as to adapt various changes.

In order to effectively cope with many of various problems regarding weather, earthquake, natural environment, human health, economy and the like, not the short term prediction as described above, but prediction of a phenomenon that will occur in the future (that is, after a long period of time has passed) is important. However, as described above, a method for predicting the future of a phenomenon that changes with time has not been scientifically established. Therefore, in order to solve problems faced by modern society such as abnormal weather, severe earthquake, environmental disruption, the development of disease, and crisis, an ex-post facto method in which restoration is performed after the constancy collapses is a major method. In order to appropriately cope with and thereby solve a problem of a phenomenon that changes with time such as weather, earthquake, natural environment, human health, and economy, it is necessary to predict symptoms of the constancy collapse in advance, and prepare beforehand for the problem.

However, in a phenomenon that changes with time, the future is not a simple repetition of the past. Further, input in the past is output with a time delay. Therefore, the future of a phenomenon that changes with time cannot be predicted only by understanding and utilizing the current state of the phenomenon. Prediction of the future of a phenomenon that changes with time is to provide options that enable the maintenance of the constancy or the induction to a new state. In order to achieve this, it is necessary to divide time series data into specific time frames and find change patterns having a common structure from the time frames.

If there is the same system or a similar system in a phenomenon that has been observed for a long period of time, the future of the phenomenon can be predicted using past and current data by finding a changing rule of the systems. However, if there is no same or similar state or system never again, it is not possible to predict the change of the system by using only information about the phenomenon. However, even in such a case, a similar system may be used, or transition of the same system may be present in another phenomenon. In this case, if there is a similar transition pattern in a large number of system transitions obtained from another phenomenon, the similar transition pattern can be utilized in the prediction of the future.

Examples of a method for extracting the characteristics of time series data include the application of a state space model. Time series elements extracted from the state space model includes a plurality of terms (namely, basis functions) and parameters (namely, coefficients). For example, a widely-used linear model includes time delay terms and parameters thereof. The interrelationship between elements with time delays can be found out from the terms included in the model (K. Judd and A. I. Mees, PhySICa D 120, 273 (1998). T. Nakamura, K. Judd, A. I. Mees, and M. Small, Int. J. Bifurcation Chaos Appl. Sci. Eng. 16, 2153 (2006).). However, it is not possible to know the structure included in time series data such as a way of hierarchical connection between the elements only from the expression of the model.

Further, in Patent Document 1, a future value is predicted in the following manner. Target time series data of prediction is projected onto a feature space, and a learning pattern that has a correlation with the projection pattern is specified. Then, the second time series data that has been previously associated with the first time series data corresponding to the specified learning pattern, and is generated at a later timing than the first time series data is determined as a future value.

CITATION LIST

Patent Document

Patent Document 1: Japanese Patent Application Laid-Open No. 2005-216202

SUMMARY

Problems to be Solved by the Invention

In order to perform future prediction using time series data, it is necessary to analyze a huge amount of time series data in the past, and extract and classify the structures of time delay included in the time series data. In order to achieve this, a method for creating a time structure from time series data is required.

However, it has been difficult to extract the structure of time series data using conventional techniques.

The present technique has been made in view of such a situation, and makes it possible to extract the structure of time series data.

Solutions to Problems

One aspect of the present technique is an information processing device that includes an acquisition unit which acquires time series data, a conversion unit which converts the obtained time series data into an RAR model, and a prediction unit which predicts the future of an event, the event being currently in progress, using the RAR model.

The information processing device may further include a creation unit which creates a network structure from the RAR model.

The creation unit may determine time delay terms of the RAR model as nodes of the network structure, and connect the nodes to a term at the current time of the RAR model to create the network structure.

A direct distance between two of the nodes of the RAR model may be defined by a ratio of a parameter of one of the two nodes to the square root of the sum of the squares of all parameters of the RAR model.

When two of the nodes are connected to each other via another one or more of the nodes, the creation unit may determine the sum of direct distances between the respective connected nodes as an indirect distance.

The creation unit may create the network structure by nodes connected to each other with a path having a shortest distance between the direct distance and the indirect distance.

The information processing device may further include a retrieval unit which retrieves the homology between different time series data from the characteristics of the network structure.

The retrieval unit may convert the network structure into a matrix, and retrieve the homology of the matrix.

The retrieval unit may arrange the nodes in the horizontal direction and the vertical direction, and put one and the other of 1 and 0 at respective positions of nodes connected to each other and nodes unconnected to each other to form the matrix.

The matrix includes a plurality of matrices, and the retrieval unit may retrieve the homology by a value obtained in such a manner that a difference between the plurality of matrices is calculated after matching the sizes thereof, and the square root of the sum of the squares of elements constituting the difference is divided by the number of the elements.

Each of a method, a recording medium, and a program of one aspect of the present technique corresponds to the imaging device of one aspect of the present technique described above.

In one aspect of the present technique, the acquisition unit acquires time series data, the conversion unit converts the obtained time series data into an RAP, model, and the prediction unit predicts the future of an event that is currently in progress using the PAR model.

Effects of the Invention

As described above, according to one aspect of the present technique, it is possible to extract the structure of time series data.

Additional features and advantages are described herein, and will be apparent from the following Detailed Description and the figures.

DETAILED DESCRIPTION

Hereinbelow, embodiments for carrying out the present technique will be described. The description will be made in the following order.

1. Progress
2. Prediction Processing
3. RAR Model
4. Network Construction Method
5. Method for Detecting Homology of Network
6. Method for Detecting Relationship between Network Substructures
7. Method for Detecting Relationship between Time Structures of Elements Constituting Phenomenon
8. Network Example 1
9. Network Example 2

<Progress>

The present technicians have thought that, in order to find out the characteristics included in a time structure such as a function of time series data and time delays included in the time series data, it is useful to construct a model that reflects the function of the time series data from the time series data, and construct a network structure of the model. In order to achieve this, it has been thought that it is necessary to first find time delays present in the time series as elements constituting a network, and then represent the found time delay terms as the network. In order to accurately know time delays, the present technicians have decided to use a reduced autoregressive (RAR model (K. Judd and A. I. Mees, PhySICa D 120, 273 (1998).).

An average autoregressive (AR) model includes successive terms with time delays. However, some of the terms (some of the time delays, for example) may be unnecessary to grasp the essential features of a phenomenon. In an RAR model, only terms that are evaluated using an information criterion as having dominantly contributed to the model are used. Therefore, the RAR model can show the accurate interrelationship between time delay terms and the essential linear structure included in the time series.

The RAR model may include two terms having a weak correlation. However, it is not always true that only two terms having a strong correlation are important for the system, and two terms having a weak correlation are unnecessary for the system. Terms having a weak correlation may hold an important role as a catalyst for the system. Such terms cannot be found by a method using only the correlation between two terms.

This is the reason why the present technique employs not a correlation function, but a model that can grasp the entire time series as a system when selecting a time delay term. In the present technique, after an RAR model is constructed, respective terms included in the model are converted into nodes, and each of parameters of the model is converted into the length of a link between the respective nodes of the network.

The RAR model of the present technique includes the following two stages.

(1) Production of an RAR model from time series data
(2) Construction of a network from the RAR model <Prediction Processing>

Figure 1:
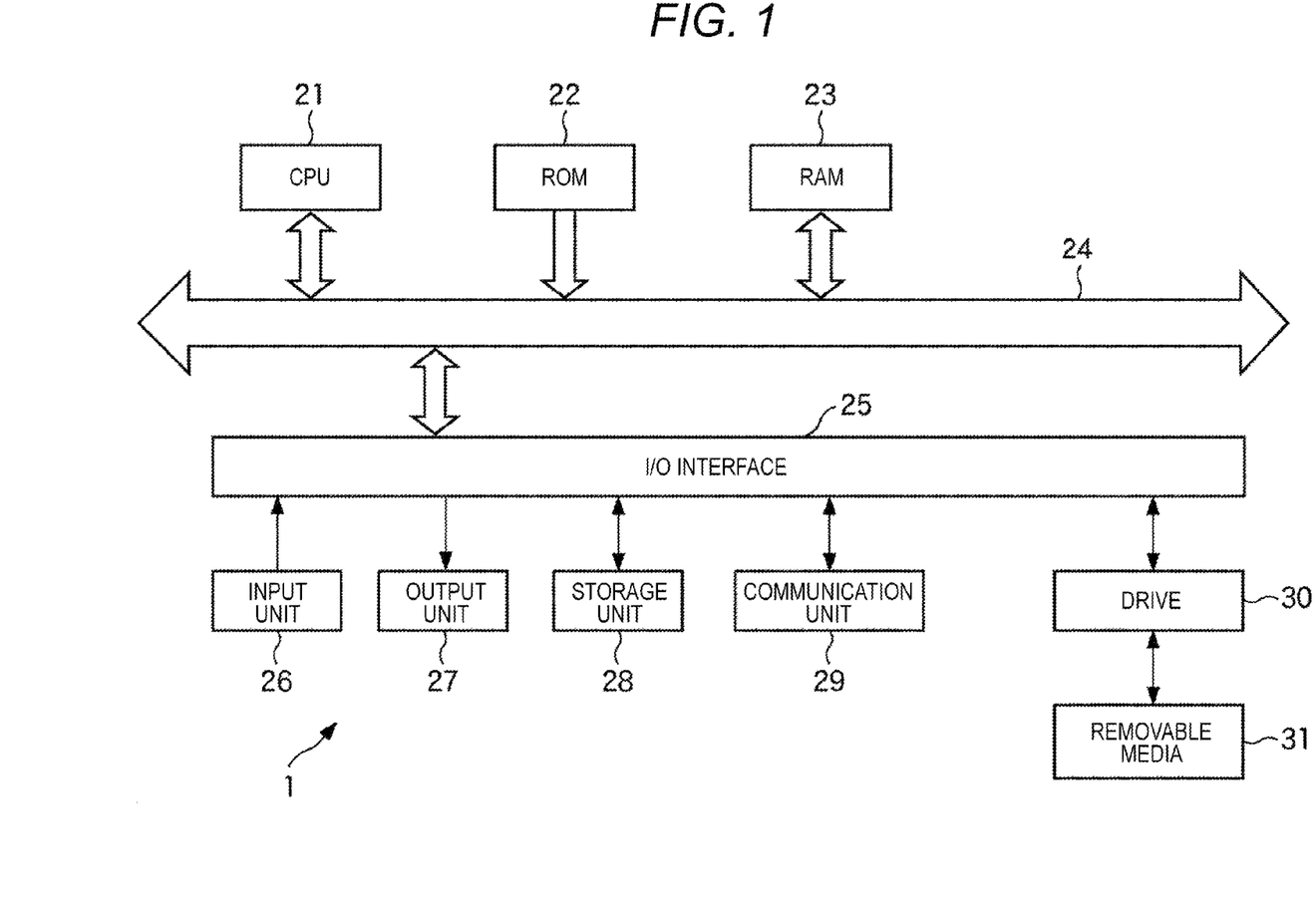
FIG. 1 is a block diagram illustrating the configuration of an embodiment of an information processing device of the present technique.

Information processing for future prediction of the present technique is executed by, for example, an information processing device 1 shown in FIG. 1.

FIG. 1 is a block diagram illustrating the configuration of an embodiment of the information processing device 1 of the present technique.

In the information processing device 1 which performs prediction processing, a central processing unit (CPU) 21, a read only memory (ROM) 22, a random access memory (RAM) 23 are connected to each other by a bus 24.

An input/output (I/O) interface 25 is further connected to the bus 24. An input unit 26, an output unit 27, a storage unit 28, a communication unit 29, and a drive 30 are connected to the I/O interface 25.

The input unit 26 includes a keyboard, a mouse, a microphone and the like. The output unit 27 includes a display, a speaker and the like. The storage unit 28 includes a hard disk, a nonvolatile memory and the like. The communication unit 29 includes a network interface and the like. The drive 30 drives a removable media 31 such as a magnetic disk, an optical disk, a magneto-optical disk, and a semiconductor memory.

In the information processing device 1 having the above configuration, the CPU 21 loads a program stored in the storage unit 28 into the RAM 23 via the I/O interface 25 and the bus 24 to execute the program, thereby performing a series of processing.

In the information processing device 1, a program can be installed in the storage unit 28 via the I/O interface 25 by, for example, loading the removable media 31 as a package media or the like onto the drive 30. Further, the program can be installed in the storage unit 28 by receiving the program in the communication unit 29 via a wired or wireless transmission medium. Alternatively, the program can be installed in the ROM 22 or the storage unit 28 in advance.

Figure 2:
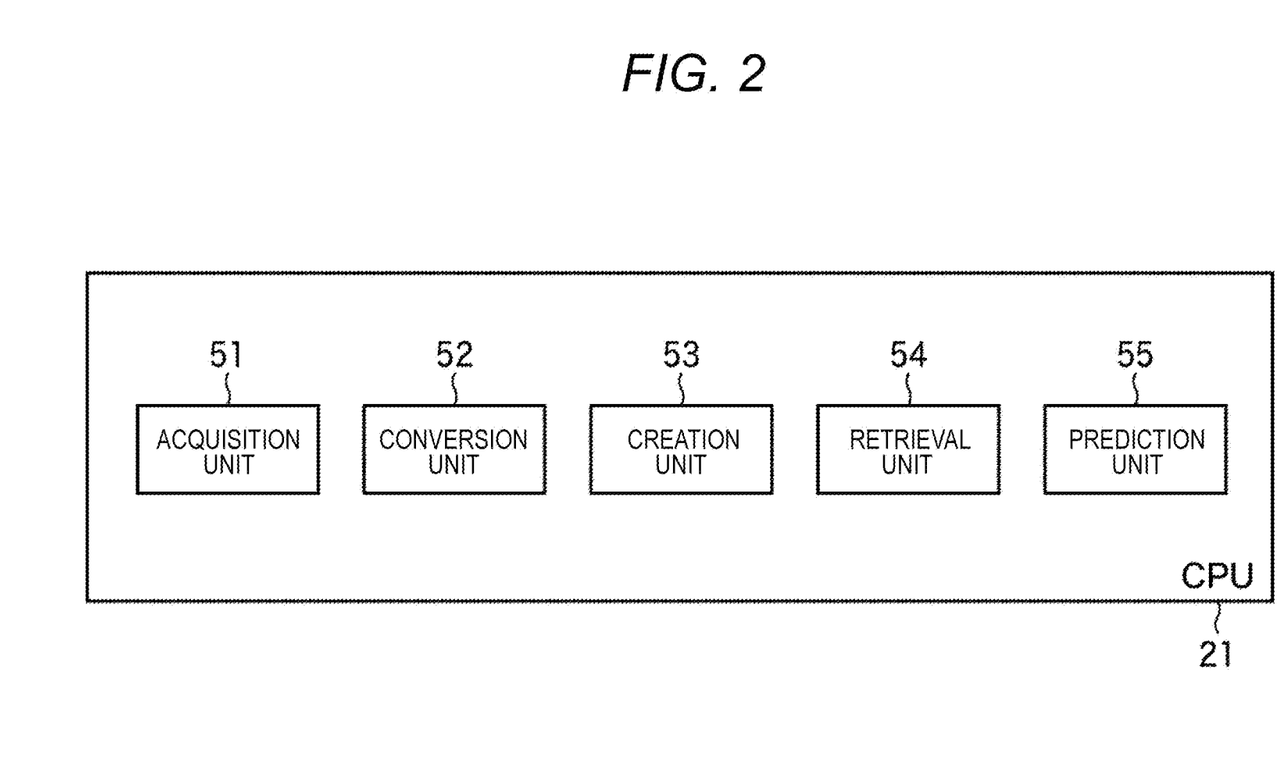
FIG. 2 is a diagram illustrating the configuration of a functional block of a CPU that performs prediction processing.

FIG. 2 is a diagram illustrating the configuration of a functional block of the CPU 21 which performs the prediction processing. The CPU 21 includes an acquisition unit 51, a conversion unit 52, a creation unit 53, a retrieval unit 54, and a prediction unit 55.

The acquisition unit 51 acquires time series data. The conversion unit 52 converts the time series data into an RAR model. The creation unit 53 creates a network structure from the RAR model. The retrieval unit 54 retrieves the homology of the network structure. The prediction unit 55 predicts a phenomenon in the future from the time series data of a phenomenon that is currently in progress.

Next, information processing for the future prediction will be described with reference to FIG. 3.

Figure 3:
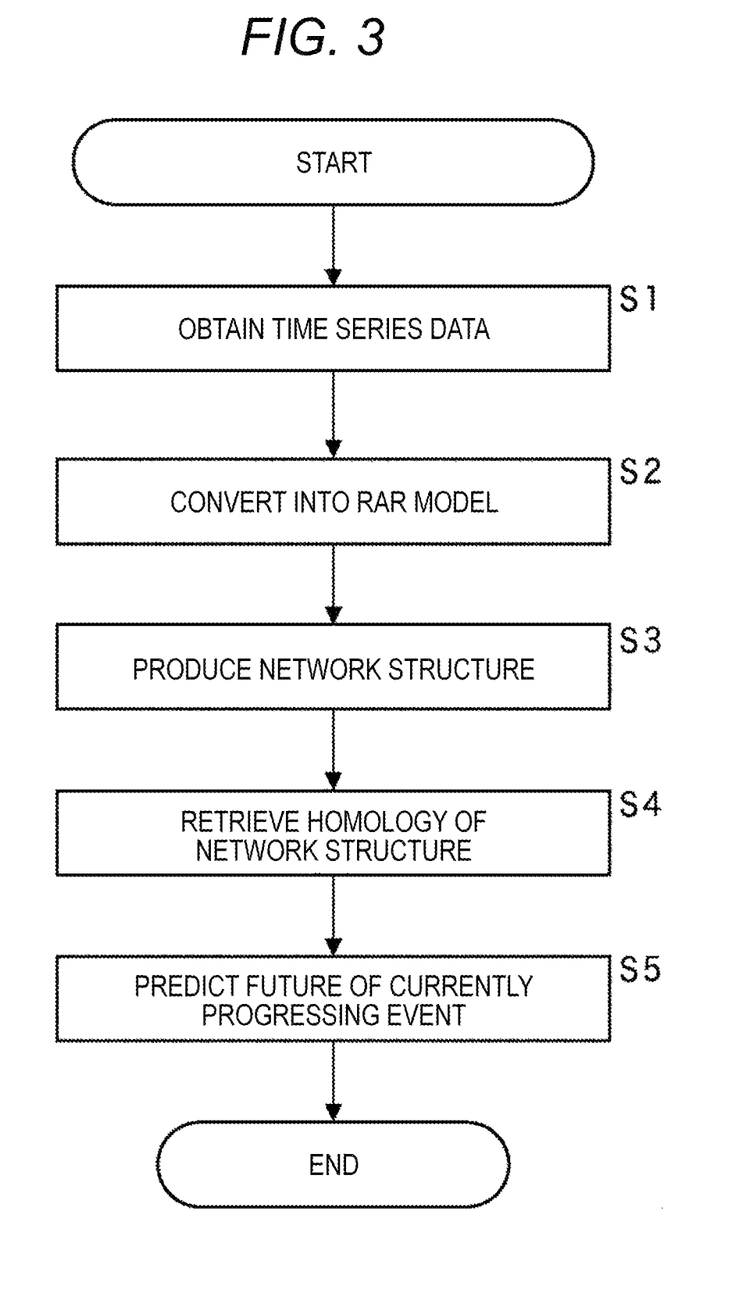
FIG. 3 is a flowchart explaining the prediction processing.

FIG. 3 is a flowchart explaining the prediction processing. In step S1, the acquisition unit 51 acquires time series data. More specifically, time series data for creating a network structure is acquired. The time series data is stored in the storage unit 28.

In step S2, the conversion unit 52 converts the time series data into an RAR model. A method for producing the RAR model from the time series data will be described later.

In step S3, the creation unit 53 creates a network structure from the RAR model. That is, the network structure is created from the RAR model that has been converted in step S2. In step S4, the retrieval unit 54 retrieves the homology of the network structure. That is, the homology between different time series data is retrieved from the characteristics of the network structure that has been created in step S3. Specifically, the network structure is clustered by the homology.

In step S5, the prediction unit 55 predicts a phenomenon in the future from the time series data of a phenomenon that is currently in progress. More specifically, a phenomenon in the future is predicted from time series data of a prediction-target phenomenon that is currently in progress using time series data in the past having the homologous network structure retrieved in step S4.

For example, time series data as a comparison target is previously stored in the storage unit 28. The homology between the comparison-target time series data and the prediction-target time series data acquired in step S1 (of course, the prediction-target time series data can also be previously stored in the storage unit 28) is retrieved. The prediction unit predicts that an event that is similar to an event to which the comparison-target time series data having a high homology corresponds may happen as an event of the prediction-target time series data.

In addition, it is possible to predict the time when myocardial infraction or diabetes is caused using heart rate data, or grasp the condition of pancreas, and predict symptoms of diabetes or pancreatic cancer using a blood sugar level.

Further, processing for predicting a phenomenon in the future will also be described later in <Method for Detecting Homology of Network>.

<RAR Model>

Hereinbelow, a method for producing an RAR model performed in step S2 of FIG. 3 will be described. The time series data acquired in step S1 is measured at a sampling frequency that can grasp the characteristics of the time series data. An RAR model with the maximum time delay w that is produced using measured time series data having a length n, the time series data being represented by Equation (1), is represented by Equation (2).

[Equation 1]

$$\{x_t\}_{t=1}^{n} \tag{1}$$

[Equation 2]

$$x(t)=a_0+a_1(t-l_1)+a_2x(t-l_2)+ \ldots a_w x(t-l_w)+\epsilon(t) \tag{2}$$

In Equation (2), $a_i$ (i=0, 1, 2, . . . , w) is an unknown parameter, and $\epsilon(t)$ is an approximation error (or a prediction error). The parameter $a_i$ and the approximation error $\epsilon(t)$ are random numbers that are independent of each other and follow the same distribution. The parameter $a_i$ is selected so as to make the approximation error minimum.

The time series data obtained by measurement contains observation noise. Therefore, the time series data contains both of data of a phenomenon itself and data of observation noise. Generally, the larger the number of parameters included in a model (that is, the larger the size of the model becomes), the smaller an approximation error between the model and the time series data becomes. Therefore, it is possible to more accurately grasp the characteristics of the used time series data.

However, the fact that the size of a model (namely, the number of parameters) becomes large, and the approximation error becomes small due to observation noise contained in time series data obtained by measurement means that the model not only grasps the characteristics of the phenomenon, but is also forced to follow accidental variations of the observation noise having no relation to the structure of a measurement target. On the other hand, a model having a small size does not sufficiently grasp the characteristics of a phenomenon, and therefore becomes unstable. Therefore, it is not possible to rely on the behavior of data obtained from the model. Thus, it is necessary to find a model that can grasp the characteristics of a phenomenon as much as possible, and also eliminate the influence of observation noise as much as possible.

In order to find such a model, various information criteria have been proposed. In an information criterion, not only the sizes of approximation errors are compared, but also the number of parameters is taken into consideration. A model having the smallest value obtained from the information criterion is determined to be optimal.

Figure 4:
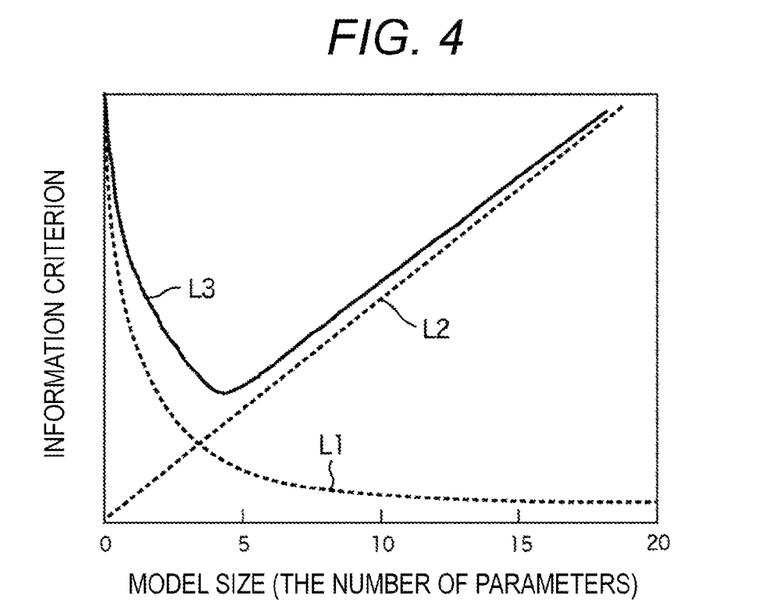
FIG. 4 is a diagram illustrating the relationship between a model size and an information criterion.

FIG. 4 is a diagram illustrating the relationship between a model size and an information criterion. In FIG. 4, the horizontal axis represents a model size (namely, the number of parameters), and the vertical axis represents an information criterion. A line $L_1$ represents the relationship when the approximation error $\epsilon(t)$ is a predetermined value. When the model size is small, the information criterion becomes large. When the model size is large, the information criterion becomes small.

In FIG. 4, the influence that is caused by the increase of the model size while the approximation error becomes small as the model size increases is represented by a line $L_2$ which shows a penalty. That is, in the penalty, the model size and the information criterion are substantially in direct proportion to each other. A line $L_3$ represents the characteristics when taking into consideration both of the approximation error $\epsilon(t)$ and the penalty, that is, the characteristics obtained by combining the line $L_1$ and the line $L_2$. A model having a size corresponding to the smallest value of the information criterion represented by the line $L_3$ is an optimal model.

There are various information criteria for selecting an optimal model. However, the present technique employs Schwarz Information Criterion (SIC) (T. Nakamura, K. Judd, A. I. Mees, and M. Small, Int. J. Bifurcation Chaos Appl. Sci. Eng. 16, 2153 (2006). G. Schwartz, Annals of Statistics 6, 461 (1978)). The SIC is an information criterion obtained from Bayesian approach. By using Bayesian theorem, it is possible to obtain a joint probability between the parameters and data. The SIC is an information criterion that gives the maximum value of the likelihood thereof. The equation of the SIC is represented by the following Equation (3). In Equation (3), n denotes the number of data, and k denotes the model size. Further, e represented by Equation (4) denotes the approximation error.

[Equation 3]
$$SIC(k) = n\ln\frac{e^2}{n} + k\ln n \quad (3)$$

[Equation 4]
$$e = \sum_{t=1}^{n} \varepsilon(t) \quad (4)$$

The left-hand side of Equation (3) corresponds to the line $L_3$ of FIG. 4, and the second term on the right-hand side thereof corresponds to the line $L_2$ which shows the penalty with respect to the model size in FIG. 4.

When producing an RAR model, it is required to select necessary time delay terms. Finding the combination of necessary terms is a non-deterministic polynomial time (NP) problem, and there are a plurality of heuristic methods. One of problems common in these methods is the difficulty of selecting a globally optimal model due to a local minimum value.

In order to avoid such a problem, a full search has been performed in the present technique. However, in the method for finding the combination of optimal terms by the full search, when the number of terms increases, the calculation time becomes enormous, and the method therefore becomes unrealistic. In such a case, a sub-optimal solution is used by using a heuristic method.

In the above, the model construction using a single variable has been described. However, the present technique can be used for multiple variables.

<Network Construction Method>

After the RAR model is produced in the above manner, processing for converting the model into a network is executed in step S3 of FIG. 3. Time delay terms included in the RAP, model are considered as nodes of a network, and connected to a term x (t) at the current time. Accordingly, a network can be obtained by directly converting the used RAR model.

In the RAR model, a term with a large coefficient is considered to have a large influence on the term x (t) at the current time. With regard to a way of introducing this "large influence" as the topology of the network, several possible ways can be considered. Here, as one measure, "the distance between nodes" corresponding to a coefficient between the term x (t) at the current time and any time delay term x (t–i) included in the RAR model is introduced. More specifically, it is considered that a term with a large coefficient is located near the term x (t) at the current time, and a term with a small coefficient is located far from the term x (t).

Equation (2) can be interpreted as the product of a coefficient vector $a=(a_1, a_2, \ldots, a_w)$ and linearly independent terms $(x(t-l_1), x(t-l_2), \ldots, x(t-l_w))$. Since a parameter $a_0$ and the approximation error $\epsilon(t)$ do not have time information, they are not used in the present technique.

Next, an angle $\theta_i$ between the term x (t) at the current time and any single time delay term x (t–i) included in the RAR model, the angle $\theta_i$ being represented by Equation (5), is introduced. That is, the angle $\theta_i$ is defined by the ratio of a parameter of the single time delay term x (t–i) to the square root of the sum of the squares of parameters of the respective terms in the RAR model. More specifically, the angle $\theta_i$ is defined by the arc cosine of the ratio.

[Equation 5]

$$\theta_i = \arccos\left(\frac{a_1}{\sqrt{a_1^2 + a_2^2 + \ldots + a_w^2}}\right) \quad (5)$$

Further, a distance $d_i$ between x (t) and x (t−i) is defined as represented by Equation (6). That is, the distance $d_i$ is defined by the ratio of a parameter of the single time delay term x (t−i) to the square root of the sum of the squares of parameters of the respective terms in the RAR model. More specifically, the distance $d_i$ is defined by the angle $\theta_i$. Further more specifically, the distance $d_i$ is defined by the absolute value of the tangent of the angel $\theta_i$.

[Equation 6]

$$d_1 = |\tan \theta_i| \quad (6)$$

In the present technique, how to define the distance introduced as one measure may differ depending on target systems. For example, the reciprocal of the coefficient may be most suitable for a certain system. However, since the distance $d_i$ defined by Equation (6) reflects the sizes of all parameters in the used model in a well-balanced manner, the distance $d_i$ is considered as being suitable in many cases.

The conversion from a linear time series model into a network topology proposed in the present technique does not depend on how to define the distance between nodes.

When looking at only Equation (2), all nodes included in the RAR model can be seen as if they were directly connected to the term x (t) at the current time. Therefore, the distance $d_i$ obtained from Equation (6) is defined as "direct distance".

On the other hand, when the time development of the system (that is, the nature of dynamics) is taken into consideration, since nodes on the network are coupled to various nodes, one pair of nodes on the network can be indirectly connected to each other via other plurality of nodes. In this case, there is a different path via another node between any two nodes. Therefore, a distance that is different from the direct distance can be obtained. Such a distance of the path via another node between any two nodes is defined as "indirect distance".

In some networks, the indirect distance in an indirect path is shorter than the direct distance in a direct path. Information most efficiently passes through an indirect path that is the shortest path. Essentially, one pair of nodes is considered to be coupled to each other in a path having the shortest distance. Paths having the shortest distance are collected, and a linear model that targets at the aggregation of the collected paths is regarded as a network to be represented.

By studying the network constructed in this manner, the hierarchical structure which cannot be understood only by looking at the linear model is made clear. As a result, it is possible to know details of how the influence of one term has passed through another term.

<Method for Detecting Homology of Network>

In order to know the state change of a phenomenon that has been observed for a long period of time, it is necessary to know whether a state obtained in some way is the same state or a different state. Accordingly, it is possible to know whether or not the state has changed or transitioned. Here, a method in which a network structure is converted into a matrix to verify the homology of the network structure. This method is performed in step S4 of FIG. 3.

For example, there is time series data in which it is revealed by the RAR model that the maximum delay time is 6, and the connection as follows exists. More specifically, x (t−1) and x (t−3) are directly connected to x (t), x (t−2) and x (t−4) are directly connected to x (t−1), x (t−6) is directly connected to x (t−3), and x (t−5) is directly connected to x (t−2).

Figure 5:
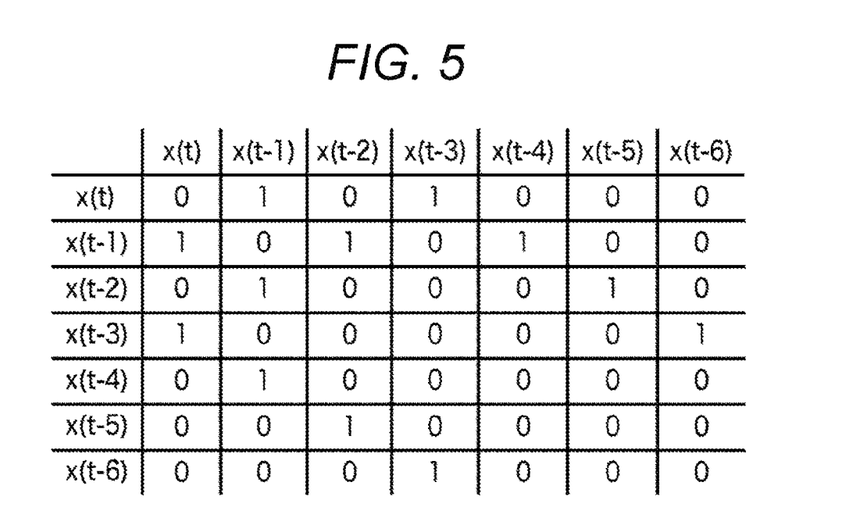
FIG. 5 is a diagram explaining matrix formulation of a network structure.
Figure 6:
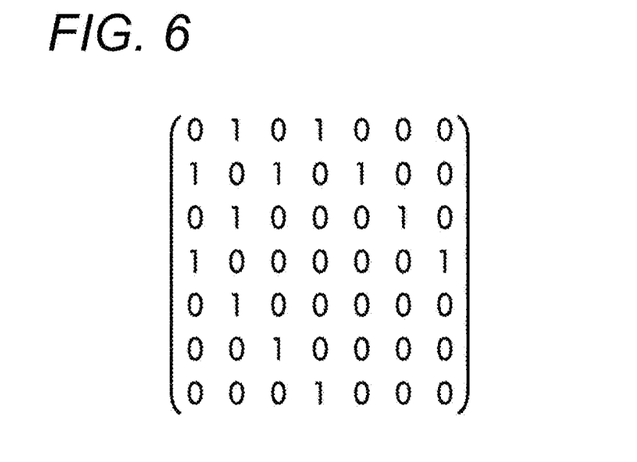
FIG. 6 is a diagram illustrating an example of a matrix.

Such a coupling relationship will be described with reference to FIG. 5 and FIG. 6. FIG. 5 is a diagram explaining matrix formulation of a network structure. FIG. 6 is a diagram illustrating an example of a matrix.

Such a coupling relationship can be expressed using a matrix. When nodes are coupled to each other, a numerical value other than 0 is given. When nodes are not coupled to each other, 0 is given. Here, a description will be made taking an example in which 1 is given when nodes are coupled to each other. Further, the coupling between the same variables is determined as 0. Accordingly, time series data of the above connection is expressed as shown in FIG. 5. In FIG. 5, respective nodes are arranged in the horizontal direction and the vertical direction, and 1 and 0 are respectively arranged at the position between connected nodes and the position between unconnected nodes.

The coupling relationship between the nodes of FIG. 5 is expressed as a matrix as shown in FIG. 6.

By performing such conversion, it is possible to convert a network structure into a matrix. The matrix obtained using this method is a symmetric matrix.

The homology between a plurality of matrices obtained in this manner is verified. When verifying the homology, the sizes of the matrices should be equal to each other. Therefore, it is necessary to match the maximum delay time of a matrix having a small size with that of a matrix having a large size.

Next, a difference between two matrices is calculated in the following manner. More specifically, matrices to be verified are defined as A and B. A difference C between A and B is calculated (C=A−B). Then, the sum of the squares of respective elements of the calculated matrix is calculated. Then, the square root of the sum is obtained, and the thus obtained value is divided by the number of elements. In this manner, it is possible to express the difference between the matrix A and the matrix B. When the two matrices are completely the same as each other, the obtained value becomes zero.

The homology between a plurality of matrices can be expressed by using the value obtained in this manner. However, it is not appropriate to uniquely determine the homology by setting a specific threshold. An appropriate threshold depends on the nature of the used data. Therefore, the nature of the used data is sufficiently examined, an appropriate threshold is then set with respect to the data to thereby verify the homology.

<Method for Detecting Relationship Between Network Substructures>

An interval in which a sufficient number of data (an interval including 100 data, for example) for modeling can be obtained is previously set, and time series data are divided into respective intervals. Time series models are constructed for time series data in the respective intervals to obtain networks thereof. The same operation is also performed with respect to a large number of time series data obtained from other events.

Next, the homology between the thus obtained large number of network structures is verified by the above method. Among the network structures, networks having a high homology are handled as the same network. By using data obtained from a large number of different events, even if a system appears only once in each event, the same system may exist by comparing with another event. As a result, labeling for each system can be performed. By comparing the transitions of labels of a large number of events, it is possible to extract changing patterns.

<Method for Detecting Relationship Between Time Structures of Elements Constituting Phenomenon>

As a classic method, there is a method for detecting a time structure using a maximum value and a minimum value by using an autocorrelation function. However, since the autocorrelation function uses the similarity of time series data, it is not possible to reflect the entire interrelationship in the time structure. Therefore, the present technique uses an RAR model as described above.

In order to accurately reflect the entire interrelationship, it is necessary to construct models using all combinations of prepared time delay terms (namely, functions), calculate information criteria of the models, and employ a model with the minimum information criterion as an optimal model. A plurality of terms included in the optimal model are determined as time structures of elements constituting a phenomenon.

The time required for selecting an optimal mode is preferably not so long. For example, the time is preferably about several days at the longest. In searching an optimal model by all combinations of functions, when the number of functions is approximately 30, the search does not take so long time. However, when the number of functions is more than approximately 30, the search takes extremely long time. Therefore, a plurality of methods (heuristic methods) that replace the full search have already been proposed, and the effectiveness of the proposed methods has been verified.

When the full search is performed, it is possible to select an optimal model. However, when a model is selected using a heuristic method, there is no guarantee that the selected model is optimal. Therefore, the selected model is treated as a suboptimal model.

Network Example 1

An application example of the present technique will be shown. First, it is assumed that the following RAR model is obtained.

$$x(t)=1.01x(t-1)+0.7x(t-3)-0.1x(t-6) \quad (7)$$

Direct distances from the node x (t−1), the node X (t−3), and the node x (t−6) in Equation (7) obtained by Equation (5) and Equation (6) to the node x (t) are represented by Equation (8).

$$d=(0.7001, 1.4499, 12.2886) \quad (8)$$

These direct distances d are calculated from Equation (5) and Equation (6). More specifically, the direct distance d (=0.7001) from the node x (t−1) to the node x (t) is a value that is obtained by calculating an angle $\theta_i$ by substituting $a_i$=1.01 in Equation (5), and then substituting the calculated $\theta_i$ in Equation (6). In the same manner, the direct distance d (=1.4499) from the node x (t−3) to the node x (t) is a value that is obtained by calculating an angle $\theta_i$ by substituting $a_i$=0.7 in Equation (5), and then substituting the calculated $\theta_i$ in Equation (6). Further, the direct distanced (=12.2886) from the node x (t−6) to the node x (t) is a value that is obtained by calculating an angle $\theta_i$ by substituting $a_i$=−0.1 in Equation (5), and then substituting the calculated $\theta_i$ in Equation (6).

Figure 7:
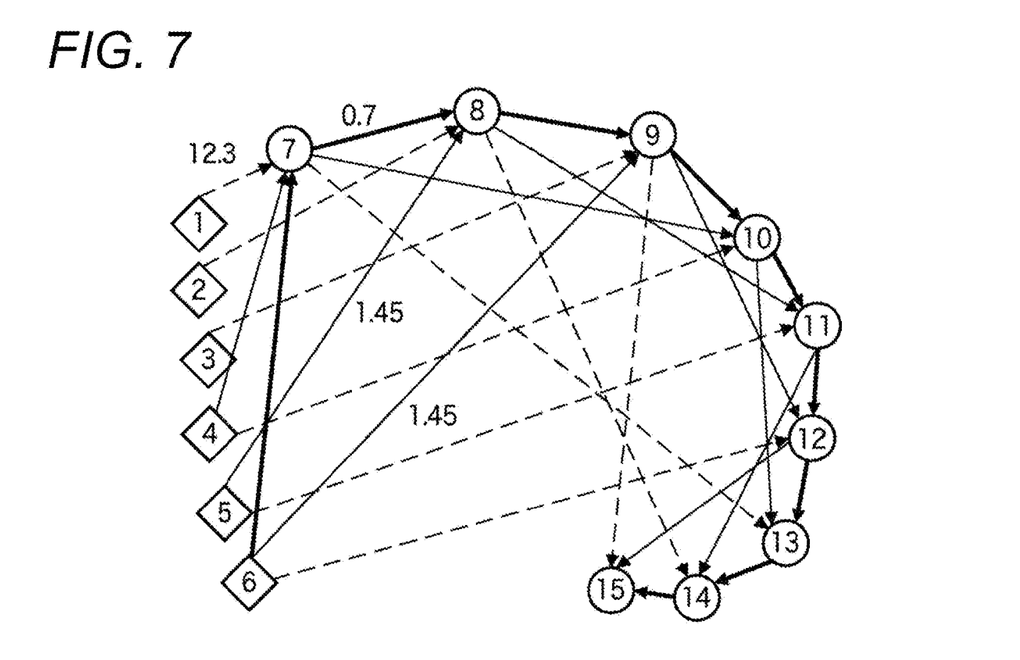
FIG. 7 is a diagram explaining a network.

FIG. 7 is a diagram explaining a network. FIG. 7 shows the entire image of the connection between nodes of the network obtained from Equation (7) by nodes of time intervals from 1 to 15. The distance between nodes represents the extent of influence with respect to other nodes. Equation (7) is a model in which the node x (t−1), the node x (t−3), the node x (t−6) are directly coupled to the node x (t).

The direct distance between any nodes in the RAR model is calculated from Equation (5) and Equation (6) by substituting any value for t in the RAR model. For example, when substituting 8 for t in the PAR model of Equation (7), Equation (7) is expressed as shown in Equation (9).

$$x(8)=1.01x(7)+0.7x(5)-0.1x(2) \quad (9)$$

When substituting i=7 in Equation (5) and Equation (6) to calculate the direct distance from the node x (7) to the node x (8), $a_i$ (i=7) in Equation (5) is obtained as 1.01 from Equation (9). This value is the same as a parameter of the node x (t−1) in Equation (7). Therefore, the direct distance from the node x (7) to the node x (8) is the same value (=0.7001) as the direct distance from the node x (t−1) to the node x (t).

Further, when substituting 7 for t in the RAR model of Equation (7), Equation (7) is expressed as shown in Equation (10).

$$x(7)=1.01x(6)+0.7x(4)-0.1x(1) \quad (10)$$

When substituting i=1 in Equation (5) and Equation (6) to calculate the direct distance from the node x (1) to the node x (7), $a_i$ (i=1) in Equation (5) is obtained as −0.1 from Equation (10). This value is the same as a parameter of the node x (t−6) in Equation (7). Therefore, the direct distance from the node x (1) to the node x (7) is the same value (=12.2886) as the direct distance from the node x (t−6) to the node x (t).

Further, when substituting 9 for t in the RAR model of Equation (7), Equation (7) is expressed as shown in Equation (11).

$$x(9)=1.01x(8)+0.7x(6)-0.1x(3) \quad (11)$$

When substituting i=6 in Equation (5) and Equation (6) to calculate the direct distance from the node x (6) to the node x (9), $a_i$ (i=6) in Equation (5) is obtained as 0.7 from Equation (11). This value is the same as a parameter of the node x (t−3) in Equation (7). Therefore, the direct distance from the node x (6) to the node x (9) is the same value (=1.4499) as the direct distance from the node x (t−3) to the node x (t).

In FIG. 7, a value described at the point of each arrow represents the direct distance between nodes. The distances between the respective nodes are shown by the type of lines. A thick line indicates that the distance between nodes is 0.7, a dotted line indicates that the distance between nodes is 12.3, and a thin line indicates that the distance between nodes is 1.45. The positions of the nodes in the figure do not have any special meaning, and only the topology of the network is important. Further, the length of each arrow in the figure does not correspond to an actual distance.

For example, in FIG. 7, the node x (6), the node x (4), and the node x (1) are directly coupled to the node x (7). However, as described above, the direct distance is not always the shortest distance between nodes. For example, the node x (15) is directly coupled to the node x (9). However, the shortest path from the node x (9) to the node x (15) is a path via the node x (12), that is, the sum of a path "from the node x (9) to the node x (12)" and a path "from the node x (12) to the node x (15)".

Both of the direct distance "from the node x (9) to the node x (12)" and the direct distance "from the node x (12)

to the node x (15)" are 1.45. Therefore, the indirect distance between the node x (9) and the node x (15) is 2.9(=1.45+1.45). The direct distance between the node x (9) and the node x (15) is 12.29, and therefore longer than the indirect distance therebetween. Therefore, it is understood that the most significant influence of the node x (t−6) on the node x (t) in Equation (7) is not one via direct coupling between the nodes, but one via the node x (t−3).

Figure 8:
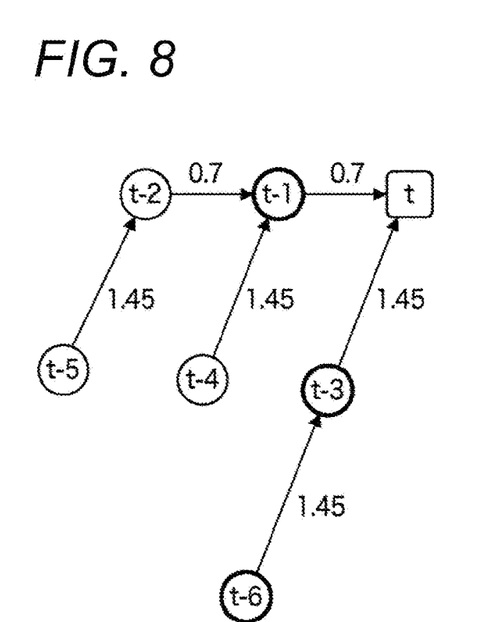
FIG. 8 is a diagram explaining optimal paths.

In order to more clearly show the structure of the network of Equation (7), a network including only optimal paths is shown in FIG. 8. FIG. 8 is a diagram explaining optimal paths.

FIG. 8 shows that the node x (t−1) and the node x (t−3) are directly connected to the node x (t), and the node x (t−6) is connected to the node x (t) via the node x (t−3). This result reflects the interrelationship between the nodes including global time information and the hierarchical structure of the model shown in Equation (7). This information cannot be found out only by examining Equation (7).

In FIG. 8, the nodes x (t−1), x (t−3), and x (t−6) indicated by thick lines are terms which are included in the model of Equation (7). Further, the nodes x (t−2), x (t−4), and x (t−5) indicated by thin lines are terms which are not included in Equation (7), but fall within 6 that is the maximum time delay of Equation (7).

Network Example 2

Figure 9:
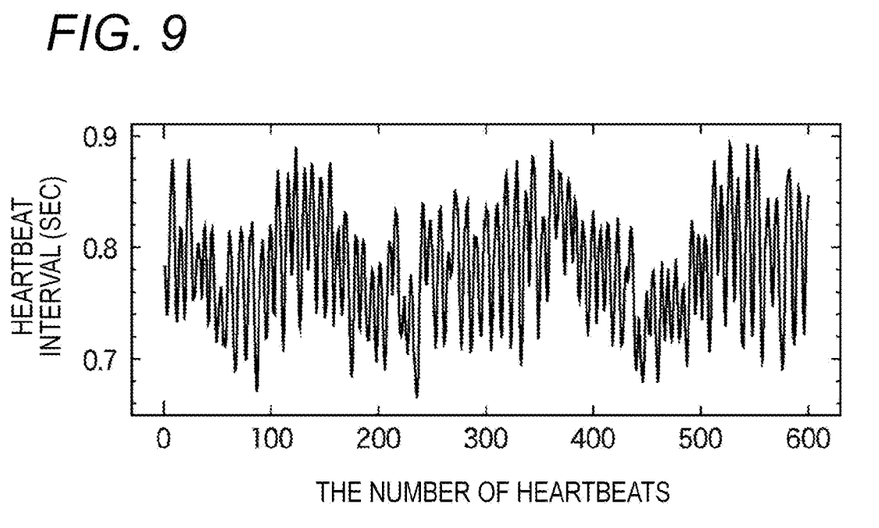
FIG. 9 is a diagram illustrating the change of heart rate.

A result obtained by using the method of the present technique in heart rate data of a healthy adult male will be shown. A subject for taking heart rate data is a 22-year-old adult male, and the measurement was performed on the subject under eyes-closed and resting state. FIG. 9 illustrates the used heart rate data. FIG. 9 is a diagram illustrating the change of the heart rate. The horizontal axis represents the number of heartbeats and the vertical axis represents a heartbeat interval (seconds).

The total number of heart rate data used in producing an RAR model is 600, and the used maximum time delay is 15. The obtained RAR model is one as shown in Equation (12).

$$x(t)=0.085+1.375x(t-1)-0.681x(t-2)+0.157x(t-7)-0.065x(t-10)+0.105x(t-12) \quad (12)$$

The direct distances from the nodes x (t−1), x (t−2), x (t−7), x (t−10), and x (t−12) of respective terms of Equation (12) to the node x (t) obtained from Equation (6) are represented by Equation (13).

$$d=(0.5162, 2.0399, 9.8214, 23.6943, 14.6556) \quad (13)$$

Figure 10:
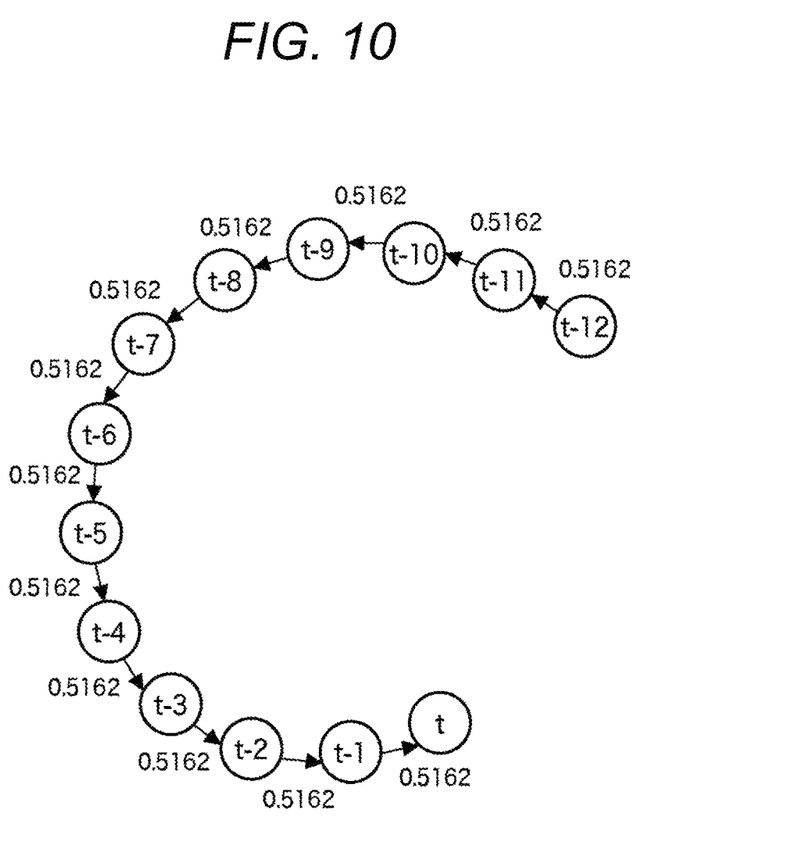
FIG. 10 is a diagram explaining a network of heart rate data.

A network obtained from Equation (12) and Equation (13) is shown in FIG. 10. FIG. 10 is a diagram explaining the network of the heart rate data. It is understood from FIG. 10 that the heart rate data used herein has a simple chain structure.

In the present technique, a method for constructing a network having a time structure based on the structure of a deterministic model that is obtained from time series has been described. According to this method, it is possible to predict the future of a phenomenon that changes with time such as weather, earthquake, natural environment, human health, and economy from time series data. In addition, it is possible to convert a linear model that has various time delays into the network topology. The advantage of the present technique with respect to an existing method is that the interrelationship between terms including the global time structure which is included in a time series model can be directly converted into the network topology. By extracting an optimal path from the constructed network, it is possible to know the interrelationship and the hierarchical structure of the model.

[Application of Present Technique to Program]

The above-described series of processing can be executed by hardware, and can also be executed by software.

When the series of processing is executed by software, programs constituting the software are installed into a computer embedded in dedicated hardware or a generic personal computer capable of executing various functions via a network or a recording medium by installing various programs.

As shown in FIG. 1, the recording medium containing such programs includes not only the removable media 31 which is distributed separately from the apparatus body in order to provide the programs and has the programs recorded thereon such as a magnetic disk (including a floppy disk), an optical disk (including a compact disk-read only memory (CD-ROM) and DVD), a magneto-optical disk (including mini-disk (MD)), and a semiconductor memory, but also the ROM 22 which is provided to a user with previously embedded in the apparatus body and has the programs recorded thereon, and a hard disk included in the storage unit 28.

In the present specification, a step of describing the programs to be recorded on the recording medium includes, of course, processing that is performed in a time series manner according to the order. However, the processing is not necessarily performed in a time series manner, and the step therefore also includes processing that is performed in a parallel or independent manner.

Further, in the present specification, the system indicates the entire apparatus including a plurality of devices.

Meanwhile, the embodiments of the present invention are not limited to the above-described embodiments and various modifications may be made without departing from the spirit of the present invention.

The present technique can have the following configurations.

(1)

An information processing device including:

an acquisition unit acquiring time series data;

a conversion unit converting the obtained time series data into an RAR model; and a prediction unit predicting the future of an event, the event being currently in progress, using the RAR model.

(2)

The information processing device according to (1), further including a creation unit creating a network structure from the RAR model.

(3)

The information processing device according to (2), wherein the creation unit determines time delay terms of the RAR model as nodes of the network structure, and connect the nodes to a term at the current time of the RAR model to create the network structure.

(4)

The information processing device according to (3), wherein a direct distance between two of the nodes of the RAR model is defined by a ratio of a parameter of one of the two nodes to the square root of the sum of the squares of all parameters of the RAR model.

(5)

The information processing device according to (4), wherein when two of the nodes are connected to each other via another one or more of the nodes, the creation unit determines the sum of direct distances between the respective connected nodes as an indirect distance.

(6)

The information processing device according to (5), wherein the creation unit creates the network structure by nodes connected to each other with a path having a shortest distance between the direct distance and the indirect distance.

(7)

The information processing device according to any of (2) to (6), further including a retrieval unit retrieving the homology between different time series data from the characteristics of the network structure.

(8)

The information processing device according to (7), wherein the retrieval unit converts the network structure into a matrix, and retrieves the homology of the matrix.

(9)

The information processing device according to (8), wherein the retrieval unit arranges the nodes in the horizontal direction and the vertical direction, and puts one and the other of 1 and 0 at respective positions of nodes connected to each other and nodes unconnected to each other to form the matrix.

(10)

The information processing device according to (8) or (9), wherein the matrix includes a plurality of matrices, and the retrieval unit retrieves the homology by a value obtained in such a manner that a difference between the plurality of matrices is calculated after matching the sizes thereof, and the square root of the sum of the squares of elements constituting the difference is divided by the number of the elements.

(11)

An information processing method including:

acquiring time series data;

converting the obtained time series data into an RAR model; and predicting the future of an event, the event being currently in progress, using the RAR model.

(12)

A recording medium readable by a computer, the recording medium having a program recorded thereon, the program causing a computer to execute:

an acquisition step of acquiring time series data;

a conversion step of converting the obtained time series data into an RAP, model; and a prediction step of predicting the future of an event, the event being currently in progress, using the PAR model.

(13)

A program causing a computer to execute:

an acquisition step of acquiring time series data;

a conversion step of converting the obtained time series data into an PAR model; and a prediction step of predicting the future of an event, the event being currently in progress, using the RAR model.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

51 Acquisition unit
52 Conversion unit
53 Creation unit
54 Retrieval unit
55 Prediction unit

The invention claimed is:

1. An information processing device comprising:

an acquisition unit acquiring time series data;

a conversion unit generating a reduced autoregressive model based on the acquired time series data;

a creation unit creating a network structure based on the reduced autoregressive model;

a prediction unit predicting a future of an event, the event being currently in progress, using the reduced autoregressive model; and an output unit configured to output a prediction result from the prediction unit to a display, wherein the reduced autoregressive model satisfies an equation $x(t)=a_0+a_1x(t-L_1)+a_2x(t-L_2)+\ldots a_wx(t-L_w)+\epsilon(t)$, wherein $x(t)$ is a term at a current time of the event, $x(t-L_i)$ is a time delay term, $L_i$ ($i=1, 2, \ldots w$) is an integer, $a_i$ ($i=0, 1, 2, \ldots w$) is a parameter of the time delay term, and $\epsilon(t)$ is an approximation error, wherein nodes of the network are based on time delay terms of the reduced autoregressive model, and the nodes are connected to the term at the current time of the event, and wherein a direct distance between two nodes of the network is defined by a ratio, wherein the ratio is the parameter of the time delay term divided by a square root of a sum of squares of all parameters of respective terms in the reduced autoregressive model.

2. The information processing device according to claim 1, wherein when two of the nodes are connected to each other via another one or more of the nodes, the creation unit determines the sum of direct distances between the respective connected nodes as an indirect distance.

3. The information processing device according to claim 2, wherein the creation unit creates the network structure by nodes connected to each other with a path having a shortest distance between the direct distance and the indirect distance.

4. The information processing device according to claim 3, further comprising a retrieval unit retrieving a homology between different time series data from characteristics of the network structure.

5. The information processing device according to claim 4, wherein the retrieval unit converts the network structure into a matrix, and retrieves the homology of the matrix.

6. The information processing device according to claim 5, wherein the retrieval unit arranges the nodes in a horizontal direction and a vertical direction, and puts 1 for the nodes connected to each other and 0 for nodes unconnected to each other to form the matrix.

7. The information processing device according to claim 6, wherein the matrix comprises a plurality of matrices, and the retrieval unit retrieves the homology by a value obtained in such a manner that a difference between the plurality of matrices is calculated after matching the sizes thereof, and the square root of the sum of the squares of elements constituting the difference is divided by the number of the elements.

8. An information processing method comprising:
acquiring time series data;
generating a reduced autoregressive model based on the acquired time series data;
creating a network structure based on the reduced autoregressive model;
predicting a future of an event, by a prediction unit, the event being currently in progress, using the reduced autoregressive model; and
outputting a prediction result from the prediction unit to a display,
wherein the reduced autoregressive model satisfies an equation $x(t)=a_0+a_1x(t-L_1)+a_2x(t-L_2)+\ldots a_wx(t-L_w)+\epsilon(t)$, wherein $x(t)$ is a term at a current time of the event, $x(t-L_i)$ is a time delay term, $L_i$ ($i=1, 2, \ldots w$) is an integer, $a_i$ ($i=0, 1, 2, \ldots w$) is a parameter of the time delay term, and $\epsilon(t)$ is an approximation error,
wherein nodes of the network are based on time delay terms of the reduced autoregressive model, and the nodes are connected to the term at the current time of the event, and
wherein a direct distance between two nodes of the network is defined by a ratio, wherein the ratio is the parameter of the time delay term divided by a square root of a sum of squares of all parameters of respective terms in the reduced autoregressive model.

9. A non-transitory recording medium readable by a computer, the non-transitory recording medium having a program recorded thereon, the program causing the computer to execute:

an acquisition step of acquiring time series data;

a generation step of generating a reduced autoregressive model based on the acquired time series data;

a creation step of creating a network structure based on the reduced autoregressive model;

a prediction step of predicting a future of an event, by a prediction unit, the event being currently in progress, using the reduced autoregressive model; and an output step of outputting a prediction result from the prediction unit to a display, wherein the reduced autoregressive model satisfies an equation $x(t)=a_0+a_1x(t-L_1)+a_2x(t-L_2)+\ldots a_wx(t-L_w)+\epsilon(t)$, wherein $x(t)$ is a term at a current time of the event, $x(t-L_i)$ is a time delay term, $L_i$ ($i=1, 2, \ldots w$) is an integer, $a_i$ ($i=0, 1, 2, \ldots w$) is a parameter of the time delay term, and $\epsilon(t)$ is an approximation error, wherein nodes of the network are based on time delay terms of the reduced autoregressive model, and the nodes are connected to the term at the current time of the event, and wherein a direct distance between two nodes of the network is defined by a ratio, wherein the ratio is the parameter of the time delay term divided by a square root of a sum of squares of all parameters of respective terms in the reduced autoregressive model.

* * * * *